United States Patent
Park et al.

(10) Patent No.: US 9,026,681 B2
(45) Date of Patent: May 5, 2015

(54) FLEXIBLE HARDWARE MODULE ASSIGNMENT FOR ENHANCED PERFORMANCE

(71) Applicant: QUALCOMM Incorporated, San Diego, CA (US)

(72) Inventors: Hee-Jun Park, San Diego, CA (US); Alex Kuang-Hsuan Tu, San Diego, CA (US); Thomas Andrew Sartorius, Raleigh, NC (US); Richard Gerard Hofmann, Cary, NC (US); Thomas Andrew Morison, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/962,770

(22) Filed: Aug. 8, 2013

(65) Prior Publication Data

US 2015/0046604 A1 Feb. 12, 2015

(51) Int. Cl.
*G06F 13/38* (2006.01)
*G06F 3/00* (2006.01)
*G06F 13/10* (2006.01)

(52) U.S. Cl.
CPC .............. *G06F 13/385* (2013.01); *G06F 13/10* (2013.01); *G06F 3/00* (2013.01)

(58) Field of Classification Search
CPC .......... G06F 13/385; G06F 3/00; G06F 13/10
See application file for complete search history.

(56) References Cited

U.S. PATENT DOCUMENTS

| | | | |
|---|---|---|---|
| 7,093,147 B2 | 8/2006 | Farkas et al. | |
| 7,412,353 B2 | 8/2008 | Borkar et al. | |
| 8,161,482 B1 | 4/2012 | Sakarda | |
| 8,407,451 B2 | 3/2013 | Meil et al. | |
| 8,543,843 B1 * | 9/2013 | Cheng et al. | 713/300 |
| 2012/0210071 A1 | 8/2012 | Black et al. | |

* cited by examiner

*Primary Examiner* — Zachary K Huson
(74) *Attorney, Agent, or Firm* — Haynes and Boone, LLP

(57) ABSTRACT

A system is disclosed for mapping operating-system-identified addresses for substantially-identical hardware modules into performance-parameter-based addresses for the hardware modules. The mapping is accomplished by configuring a flexible I/O interface responsive to a characterization of at least one performance parameter for each hardware module.

20 Claims, 3 Drawing Sheets

FLEXIBLE HARDWARE MODULE ASSIGNMENT FOR ENHANCED PERFORMANCE

TECHNICAL FIELD

This application relates to hardware module mapping on a system-on-a chip (SOC).

BACKGROUND

As circuit density has increased, the various components of an electronic system may be integrated onto a single chip to form a system-on-a chip (SOC). The advances in circuit density enable an SOC to include multiple instantiations of a circuit module or hardware module. For example, an SOC for a smartphone may include a multi-core central processing unit (CPU), a digital signal processor (DSP) with a plurality of hardware threads, a graphics processing unit (GPU) including a plurality of algorithmic logic units (ALUs), a plurality of wireless local area network (WLAN) interfaces, a modern having several vector processing engines (VPEs), and multiple L2 cache on-chip memories. As used herein, the terms "hardware core" or "hardware module" are used interchangeably with regard to such multiple instantiations of the same SOC circuit.

An SOC will typically be configured with an operating system or some other type of host software application that will select a particular module from a group of the same hardware modules for a particular task. To enable such a selection, each hardware core in a group of similar hardware cores may be associated with a serial number or character that serves as identification (ID) or an address of the hardware module. The address may be based upon the geographical location of a hardware core on a die or its manufacturing order. Using the address, the operating system selects a particular hardware module from a group of such hardware modules for a particular task. For example, a conventional SOC 100 is shown in FIG. 1 that includes an operating system 105. SOC 100 includes four hardware modules of the same type, including a unit 0, a unit 1, a unit 2, and a unit 3. As discussed above, the hardware modules may comprise a group of ALUs, processor cores, VPEs, and so on. Ideally, each hardware module should have the same characteristics and performance as do the remaining hardware modules in the group. But it is common for a group of identical hardware modules to show considerable variation in their performance and properties, particularly in high-density SOCs. For example, even if the hardware modules are directly adjacent to one another on the SOC's die, the die itself has semiconductor process variations that cause identical circuits to behave differently. Moreover, the die may have temperature or voltage variations at the different locations for the hardware modules that will also affect their performance.

An example variable performance parameter for the hardware modules is their leakage current. The leakage current from each hardware module is typically a significant factor with regard to power consumption. But the degree of leakage may vary considerably from module to module due to process, voltage, and temperature variations across the die. Moreover, leakage current is also a function of the hardware module's temperature. As the temperature goes up, so does the leakage current. To minimize power consumption, operating system 105 should select the hardware module having the lowest leakage current. Thus, it is known to test and characterize the leakage current from each hardware module so that operating system 105 is programmed to select for the module with lowest leakage current. Operating system 105 selects the units through a fixed input/output (I/O) interface 115. I/O interface 115 is deemed as "fixed" in that the identity of the units is static—operating system identifies them by their unit number, which does not change. If unit 0 has shown the least leakage, operating system 105 selects unit 0 to perform a task by transmitting the unit 0 address (which may comprise an interrupt) along with the task command to interface 115. Interface 115 then addresses unit 0 to perform the commanded task accordingly. Similarly, should operating system 105 select unit 3 for a task, interface 115 would receive the unit 3 address and select for unit 3 accordingly. But note that operating system 105 is open to inspection by interested parties. The identity of the leakiest hardware modules may comprise sensitive business information that would then be compromised by outsiders reading the programming code for operating system 105.

There is thus a need in the art for a flexible hardware module selection that isolates the operating system from an adaptive selection of the hardware modules based upon their performance characteristics.

SUMMARY

A system-on-a-chip (SOC) is disclosed that includes a flexible I/O interface and a plurality of substantially identical hardware modules. The flexible I/O interface is configured to receive from an operating system for the SOC operating-system-identified addresses for the hardware modules and to map the operating-system-identified addresses into performance-parameter-based addresses for the hardware modules responsive to a characterization of at least one performance parameter for each hardware module. The type of the performance parameter may be determined by a mode of operation for the operating system. For example, in a low power mode of operation, the flexible I/O interface is configured to map the operating-system-identified addresses responsive to a characterization of the leakage current for the hardware modules.

The flexible I/O interface does not communicate the mappings of the operating-system-identified addresses to the operating system. The operating system thus does not have access to the performance parameter characterizations for the hardware modules.

DETAILED DESCRIPTION

Figures 1, 2:
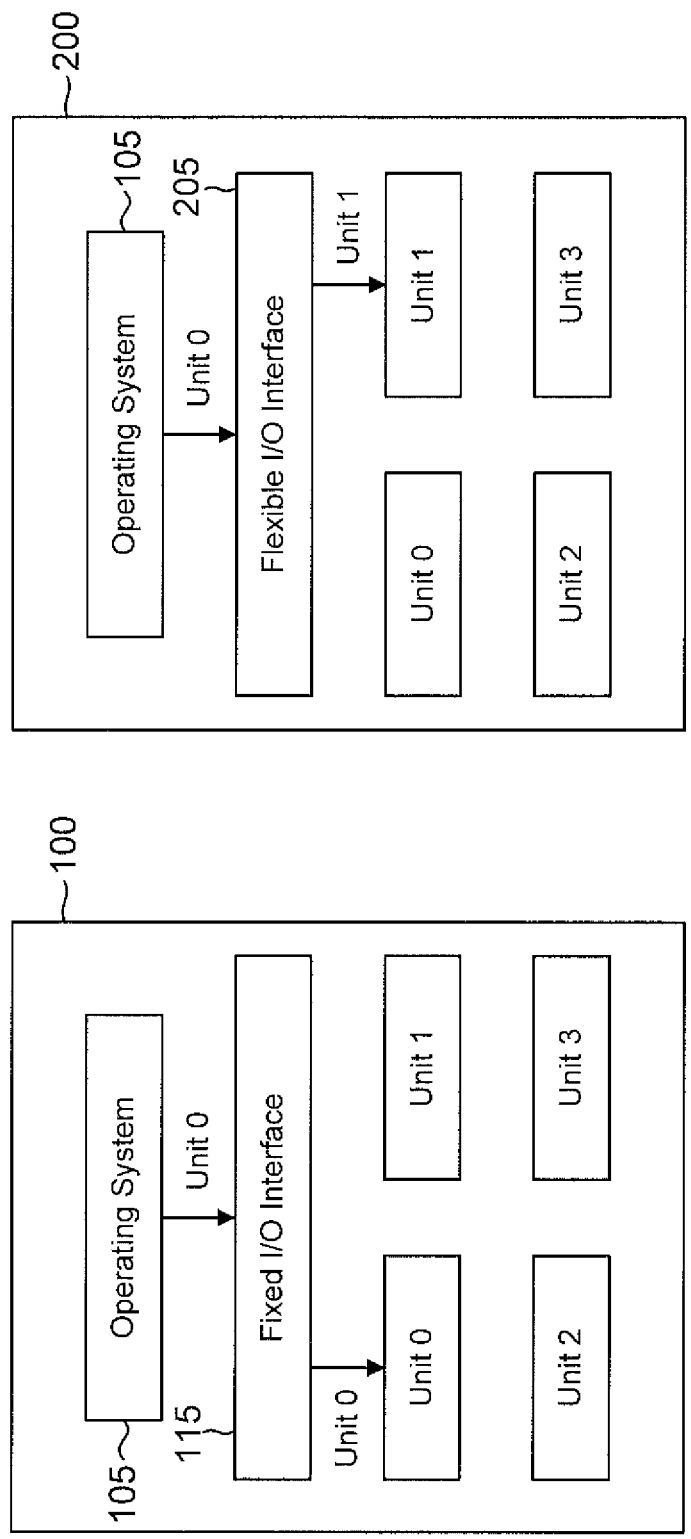
FIG. 1 schematically shows a conventional system-on-a chip (SOC) that includes a fixed I/O interface.
FIG. 2 schematically shows a SOC having a flexible I/O interface according to an embodiment of the present disclosure.

An SOC having a flexible I/O interface is disclosed that receives an identification (ID) of a hardware module from an operating system to select the identified hardware module to perform a desired task. The identification may comprise an address, an interrupt, or other suitable means of identifying a particular hardware module. Responsive to a mapping of the received identification from the operating system, the flexible I/O interface selects from a group of substantially similar hardware modules. As used herein, hardware modules that have identical or very similar circuitry are denoted as "substantially similar" in that their leakage currents and operating speeds will vary with their physical location on the die in which the SOC is integrated despite their similar or identical circuit configurations. Moreover, the die area occupied by the various hardware modules will have different temperatures depending upon whether a hardware module has been recently operated or instead has been quiescent or shut down (power collapse). In addition, a hardware module may be heated by the use of adjacent hardware modules or other components on the die. Each hardware module has its own ID that is used by the operating system to identify a particular hardware module from the corresponding group of hardware modules. In a conventional SOC, the operating-system-identified hardware module would respond accordingly to the task request upon selection by the operating system through its ID.

But the flexible I/O interface does not necessarily select a particular hardware module corresponding to the ID or address received from the operating system because the flexible I/O interface is configured to map the operating-system-identified address received from the operating system to a performance-parameter-based address or identification. As used herein, the terms "address" and "identification" with regard to selecting a particular hardware module are used interchangeably and simply refer to the means by which the operating system or other external components identify and select a hardware module for particular task. For example, the operating system may identify a given hardware module using a binary address or through an appropriate interrupt. The flexible I/O interface performs the mapping of the operating-system-identified address responsive to a preexisting characterization of at least one performance parameter for each hardware module. This mapping may also be responsive to modes of operation for the operating system with regard to what hardware module would be desirable given the operating preferences for a current mode of operation. But the operating system is not privy to the mapping of the operating-system-identified addresses into the performance-parameter-based addresses. In this fashion, the flexible I/O interface isolates the operating system from the preexisting characterization of the performance parameter(s) for the hardware modules so as to maintain the privacy of this business information. Moreover, an industry standard operating system may seamlessly interact with the flexible I/O interfaces disclosed herein without requiring any software modifications.

Example Embodiments

FIG. 2 illustrates an SOC 200 including a flexible I/O interface 205. As discussed with regard to SOC 100, SOC 200 includes a group of hardware modules and an operating system 105. Each hardware module or hardware core is identical to or substantially similar to the remaining hardware modules. The types of hardware modules may include, but are not limited to, central processing units (CPU) in a multicore processor, hardware threads in a digital signal processor (DSP), algorithmic logic units (ALUs) in a graphics processing unit (GPU), wireless local area networks (WLANs), vector processing engines (VPEs) in a modem, or L2 caches as used in on-chip memories (OCMEMs) used for various parallel processing purposes. For example, SOC 200 may include a group of identical processor cores, a group of L2 caches, a group of WLANs, and so on. The number of hardware modules in each group is arbitrary and can be varied from the four shown in SOC 200. Other groups of different hardware types are not shown in SOC 200 for illustration clarity. But it will be appreciated that SOC 200 may include a variety of such hardware module groups, each corresponding to a specific hardware module type such that each hardware module within a group is identical or substantially similar to the other members of the particular group on SOC 200.

Operating system 105 identifies the hardware modules for tasks using operating-system-identified addresses. In this example, the hardware modules are identified respectively as a unit 0, a unit 1, a unit 2, and a unit 3 hardware module. In one embodiment, these addresses or IDs comprise one or more binary or alphanumeric characters that may be assigned upon manufacture based on the physical location of the respective hardware modules on the die forming SOC 200. Other types of addresses may be used. The selection by operating system 105 of a particular hardware module address may be a predetermined decision or an adaptive one based upon current operating conditions or needs. Just like fixed I/O interface 115, flexible I/O interface 205 receives the operating-system-identified hardware module address as selected by operating system 105 for a particular task. In FIG. 2, flexible I/O interface 205 is shown receiving the unit 0 address from operating system 105 as an example. In a conventional system such as SOC 100, the unit 0 hardware module would then be selected by fixed I/O interface 115 accordingly to perform the desired task as shown in FIG. 1. In contrast, flexible I/O interface 205 maps the hardware module address received from operating system 105 into a performance-parameter-based address. For example, based upon a characterization of one or more performance parameters for the hardware modules, flexible I/O interface 205 may map the unit 0 address to the unit 1 address. The unit 1 hardware module will then perform the task that the operating system 105 "thinks" is being assigned to the unit 0 hardware module. This is quite advantageous—for example, suppose that the performance parameter that was characterized is the leakage current for each hardware module. Based upon this leakage current characterization, the flexible interface 205 may map the requested hardware module address to the hardware module having the least leakage current, whose identity is hidden from the operating system 105.

In general, for flexible I/O interface 205 to intelligently map the operating-system-identified addresses into performance-parameter-based addresses, the corresponding performance parameter(s) for hardware modules should be predetermined. The performance parameter to be characterized may be selected in anticipation of the operating system's needs or preferences such as based upon its mode of operation. For example, in one mode of operation for operating system 105, power consumption may be a critical concern. In particular, the leakage current is a predominant factor affecting power consumption. As transistors continue to be scaled for greater density, the leakage variation among hardware modules grows as well. Identical hardware modules have substantial variation in their leakage based upon their physical location on the die. To reduce power consumption, it is thus desirable to assign a task to a hardware module having the least leakage current for this particular mode of operation. Moreover, the leakage current for the hardware modules will vary depending upon their temperature. Flexible I/O interface 205 may monitor the hardware module temperatures using sensors. Alternatively, flexible I/O interface 205 may monitor the usage time of a given hardware module as a proxy for its temperature. Based upon previous measurements or simulations, flexible I/O interface 205 may then be configured with logic to gauge a hardware module's instantaneous leakage current based upon its current temperature or usage time. In addition, flexible I/O interface 205 may contain logic to estimate instantaneous leakage current based upon the usage time or temperature of adjacent hardware modules or other circuitry since a hardware module may be heated passively in this fashion and have increased leakage current despite having been quiescent or even in power collapse.

In another embodiment, the operating speed (or, for example, the operating speed and the leakage current) of each hardware module may be the predominant concern for a particular mode of operation. Based upon a characterization of the operating speeds for the hardware modules, flexible I/O interface 205 may then map the received address from operating system 105 into the hardware module address corresponding to the hardware module having the fastest operating speed. It will thus be appreciated that the mapping by flexible I/O interface 205 may be responsive to a profile for operating system 105 in addition to being responsive to a performance parameter characterization of the hardware modules. In other words, to intelligently map a given operating-system-identified address, flexible I/O interface 205 may be configured according to the rules by which operating system 105 selects a given hardware module address. The preferred order of selecting the hardware modules by the operating system can be generally known through software profiling. For example, in a low power mode of operation, operating system 105 may select for unit 0 most often. Responsive to detecting operation in the low power mode, flexible I/O interface 205 maps the unit 0 address as received from operating system 105 to the hardware module having the least leakage current. As additional hardware modules are needed, flexible I/O interface 205 may then select the hardware module with the next-to-lowest leakage current and so on such that the hardware module having the highest leakage current would be selected last. Alternatively, in a second software mode in which performance is critical, operating system 105 may select unit 3 most often. Responsive to detecting operation in the second software mode, flexible I/O interface 205 maps the unit 3 ID as received from operating system 105 to the address for the hardware module having the greatest speed. If additional processing power were necessary, flexible I/O interface 205 could then select for the next-fastest hardware module and so on. But it will be appreciated that flexible I/O interface 205 may also be configured independently of any modes of operation for operating system 105 and simply map the received addresses according to the characterized performance of the hardware modules without any knowledge of the current operation mode for operating system 105.

The characterization of a particular performance parameter for the hardware modules may be performed during the fabrication process of the SOC prior to distribution to the customer, either before or after the packaging of the die. For example, a performance parameter for a particular module may be characterized using a power gating logic, in which all other hardware modules are powered off. Techniques for measuring the leakage current or speed of hardware modules are well known in the art. Since the address mapping in flexible I/O interface 205 is independent of operating system or host 105, the performance parameters for the hardware modules are not accessible to operating system 105. Therefore, critical business information, such as the leakage current for hardware modules is kept confidential.

Figure 3:
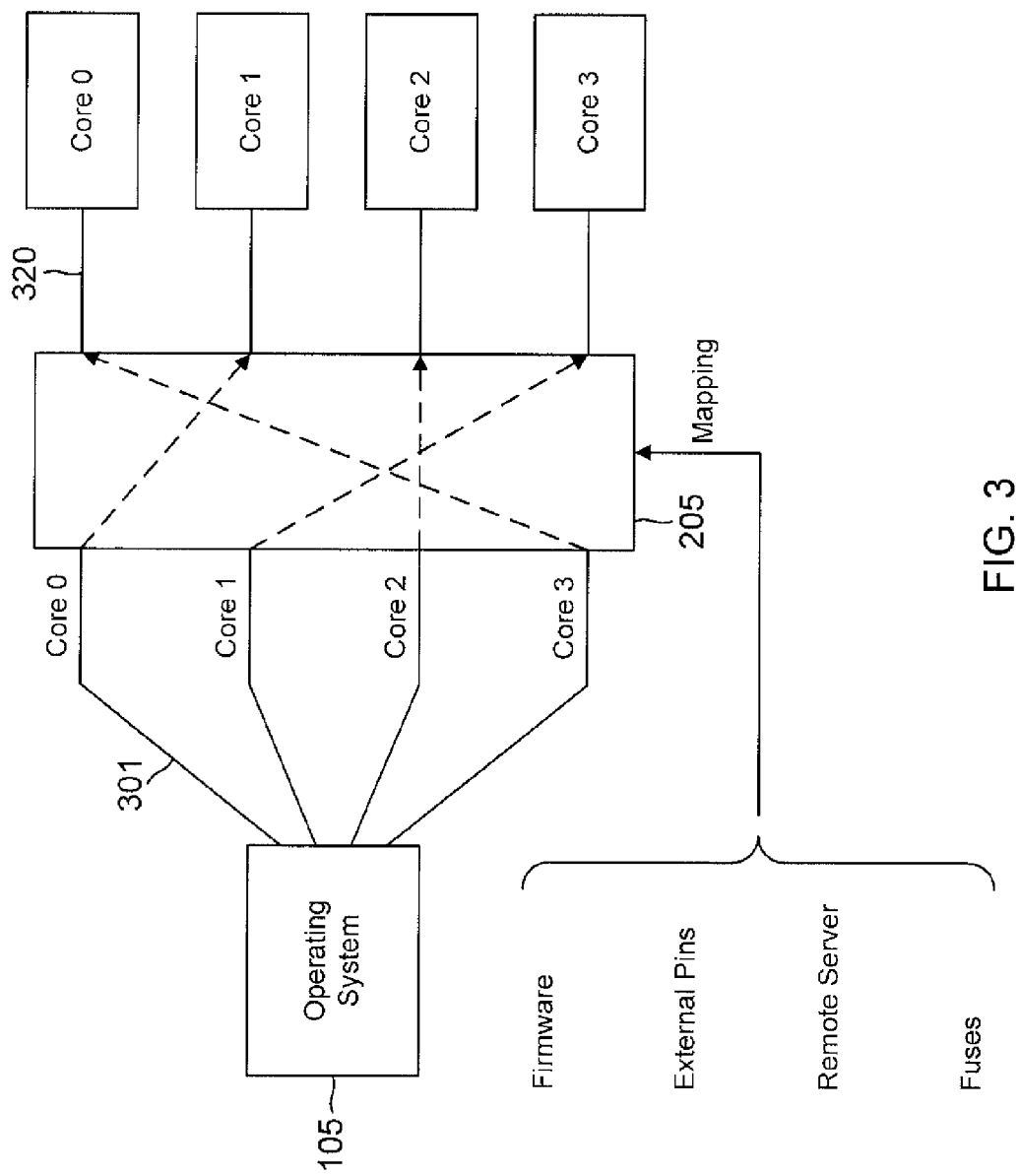
FIG. 3 schematically shows how the flexible I/O interface in FIG. 2 can be configured according to an embodiment of the present disclosure.

Flexible I/O interface 205 may be configured in various ways so as to correctly map the operating-system-identified addresses into the performance-parameter-based addresses. For example, as shown in FIG. 3, flexible I/O interface 205 may map the received identification or address based upon a configuration of firmware, or by a configuration of external pins for the SOC, or responsive to instructions from a remote server, or by the programming of fuses or other memory elements. Such configuration may occur during manufacture of the SOC or after distribution to a customer. Regardless of how and when the mapping is produced, flexible I/O interface 205 then maps operating-system-identified hardware module addresses accordingly into performance-parameter-based addresses during operation of the SOC. For example, suppose that then hardware modules comprise CPU cores designated as core 0 through core 3. The received address for a given CPU core corresponds to the generation of an interrupt 301 to the CPU core. Interrupts 301 may be hardware interrupts (an assertion of a line or lines) such as interrupt requests (IRQ), sent either from operating system 105 or from an external peripheral such as a keyboard or a mouse. In addition, the interrupts may comprise soft interrupts from one core to another. In a conventional SOC, interrupts 301 are typically gathered at a programmable interrupt controller (PIC) (not shown) and assigned to the corresponding CPU core via interconnections or busses 320 specific to each CPU core. In such conventional SOCs, interconnections 320 are fixed in that they couple to the particular CPU core 310 that is selected by interrupt 301. For example, an interrupt 301 selecting a CPU core 3 by the operating system 305 is transmitted only to the CPU core 3. Although interrupts such as interrupt 301 may comprise just the assertion of a corresponding line or lead as opposed to the transmission of a binary code, the definition of "address" as used herein includes interrupts since the interrupts identify a particular CPU core.

Based upon a performance parameter characterization of the CPU cores, flexible I/O interface 205 is configured to map an interrupt 301 intended for core 0 into one for core 1. Similarly, an interrupt 301 intended for core 1 is mapped to core 3 whereas an interrupt 301 intended for core 3 is mapped to core 0. Finally, an interrupt 301 intended for core 2 is in fact still mapped to core 2. To perform such a mapping, flexible I/O interface 205 may comprise a plurality of multiplexers configured by registers (not illustrated) storing the mapping. The example mapping of FIG. 3 is just one instantiation. It will be appreciated that the actual number of possible mappings for any given group of hardware modules is a factorial of the number of modules in the group. In this embodiment, flexible I/O interface 205 comprises a multiplexer (not illustrated) for each interconnection 320.

The configuration of the multiplexers in flexible I/O interface 205 depends upon the mode of operation for operating system 105. Should operating system 105 be in a low power mode that emphasizes power preservation, the mapping of interrupts 301 may then be based upon the previously-characterized leakage currents for the CPU cores. For example, CPU core 1 may be the core with the lowest leakage current whereas an interrupt 301 to CPU core 0 was the default interrupt from operating system 105. Flexible I/O interface 205 is thus configured to map interrupt 301 to CPU core 1 instead of CPU core 0. Advantageously, the particular mapping or rerouting within the multiplexers in flexible I/O interface 205 is not available to operating system 105. All the operating system 105 has access to are interrupts 301, which do not reveal which CPU core is ultimately selected. Therefore, the performance parameters of the CPU cores such as their leakage current level are hidden from operating system 105.

Another example of a performance parameter may be the recent usage of a hardware module such as the CPU cores of FIG. 3. If a hardware module has been recently performing, the die space holding this active hardware module will have heated up accordingly such that its leakage current or performance may be affected accordingly. Flexible I/O interface 205 may thus map a subsequent hardware module identity such as an interrupt or address received from operating system 105 to a hardware module address that corresponds to a cooler (not recently used) hardware module. Regardless of the type of performance parameter that the mapping is based upon, it will be appreciated that flexible I/O interface 205 serves in one embodiment as a means for mapping operating-system-identified addresses for the hardware modules as received from an operating system for an SOC into performance-parameter-based addresses for the hardware modules responsive to a characterization of at least one performance parameter for each hardware module. An example method for an SOC having a flexible I/O interface 205 will now be discussed.

Example Method of Operation

Figure 4:
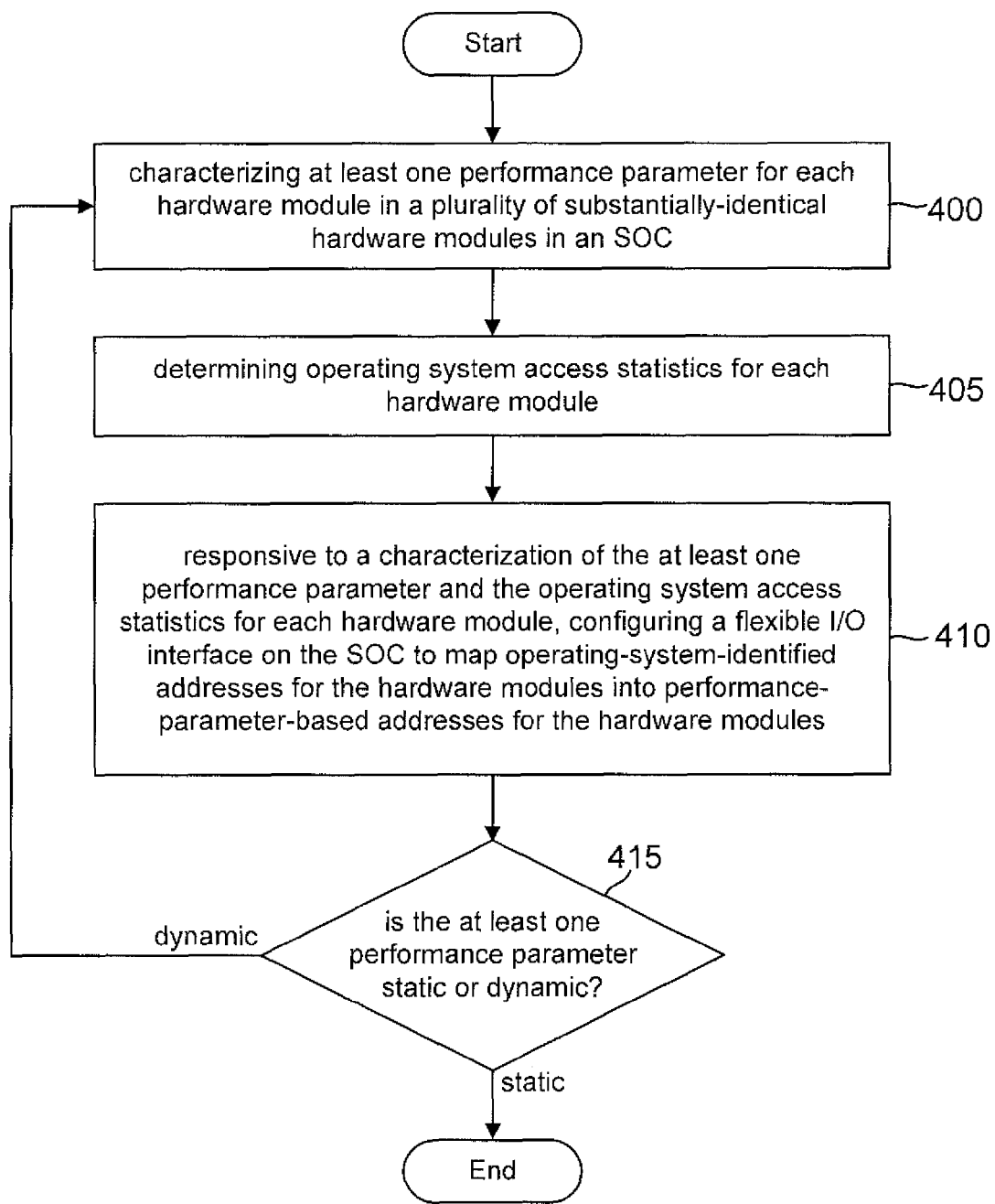
FIG. 4 is a flow chart illustrating a method of configuring the flexible I/O interface according to an embodiment of the present disclosure.

FIG. 4 is a flow chart illustrating a method of configuring the flexible I/O interface hardware modules in a system-on-a-chip (SOC) in an embodiment of the present disclosure. The method includes a step 400 of characterizing at least one performance parameter for each hardware module in a plurality of substantially-identical hardware modules in an SOC. In addition, the method includes an act 405 of determining operating system access statistics for each hardware module. For example, referring back to FIG. 2, it may be that operating system 105 is most likely to access in order of preference core 3, core 2, core 0, and core 1. The method also includes an act 410 of, responsive to the characterization of at least one performance parameter and the operating system access statistics for each hardware module, configuring a flexible I/O interface on the SOC to map operating-system-identified addresses for the hardware modules into performance-parameter-based addresses for the hardware modules. The method bifurcates at a step 415 of determining if the at least one performance parameter is dynamic. For example, suppose the order of leakage current is (from the lowest to the highest) is core 0, core 2, core 1, and core 3 and that the operating system access statistics are as in the example discussed above. In such a case, the mapping would then be as shown in FIG. 3 for flexible I/O interface 205.

If the at least one performance parameter is static (e.g., operating speed), the mapping is finished. But if the at least one performance parameter is dynamic, the method repeats steps 400, 405, and 415 periodically to update the mapping accordingly. An example dynamic performance parameter may comprise temperature dependent leakage current, temperature, usage time, usage time of adjacent hardware modules, or other suitable physical or electronic characteristics of the hardware modules. The characterization of the performance parameter(s) and operating system access statistics may be done in a chip test and/or measurement stage during the manufacturing process of the SOC. Alternatively, the characterization may be an ongoing process performed by the SOC during normal usage. The configuration of the flexible I/O interface may be further responsive to an operating profile for the operating system with regard to its modes of operations. The flexible I/O interface may further include a plurality of registers for storing the configuration data used to perform the address mapping. The flexible I/O interface may be configured during manufacture of the SOC, by firmware for the SOC, via a remote server, via external pins for the SOC, or by programming of fuses. Regardless of how the mapping has been produced, the flexible I/O interface maps operating-system-identified hardware module addresses accordingly into performance-parameter-based addresses.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A system comprising:
a plurality of substantially identical hardware modules; and
a flexible I/O interface configured to map operating-system-identified addresses for the hardware modules received from an operating system into performance-parameter-based addresses for the hardware modules responsive to a characterization of at least one performance parameter for each hardware module, wherein the flexible I/O interface is configured so that the operating system does not have access to the at least one performance parameter for each hardware module.

2. The system of claim 1, wherein the flexible I/O interface includes a plurality of registers, and wherein the flexible I/O interfaced is further configured to map the addresses received from the operating system responsive to a content of the registers.

3. The system of claim 1, wherein the flexible I/O interface comprises a plurality of multiplexers configured to map the addresses received from the operating system into the performance-parameter-based addresses.

4. The system of claim 1, wherein the at least one performance parameter is selected from the group consisting of a leakage current, an operating speed, and a temperature for each of the hardware modules.

5. The system of claim 1, wherein each hardware module is selected from a group consisting of a processor core, a hardware thread for a digital signal processor, an algorithmic logic unit for a graphics processing unit, a vector processing engine, a WLAN interface, and an L2 cache.

6. A method, comprising
responsive to a characterization of at least one performance parameter for each hardware module in a plurality of substantially-identical hardware modules in a system, configuring a flexible I/O interface on the system to map operating-system-identified addresses for the hardware modules as received from an operating system for the system into performance-parameter-based addresses for the hardware modules; and
maintaining the at least one performance parameter for each hardware module as inaccessible to the operating system.

7. The method of claim 6, further comprising configuring fuses on the system, wherein configuring the flexible I/O interface is controlled by the configured fuses.

8. The method of claim 6, wherein configuring the flexible I/O interface is controlled by firmware for the system.

9. The method of claim 6, wherein configuring the flexible I/O interface is controlled by a remote server.

10. The method of claim 6, wherein configuring the flexible I/O interface is conducted through pins on the system.

11. The method of claim 6, wherein configuring the flexible I/O interface occurs prior to distribution to a customer.

12. The method of claim 6, further comprising determining operating system access statistics for each hardware module, wherein configuring the flexible I/O interface is further responsive to the determination of the operating system access statistics.

13. The method of claim 12, further comprising characterizing a leakage current for each hardware module, wherein configuring the flexible I/O interface comprises configuring the flexible I/O interface to map: a most-likely-accessed operating-system-identified address into an address for a hardware module with the lowest leakage current, a next-to-most-likely-accessed operating-system-identified address into an address for a hardware module with the next-to-most lowest leakage current, and so on.

14. A system comprising:
a plurality of substantially identical hardware modules; and
means for mapping operating-system-identified addresses for the hardware modules as received from an operating system for the system into performance-parameter-based addresses for the hardware modules responsive to a characterization of at least one performance parameter for each hardware module, wherein the means is configured to maintain the at least one performance parameter for each hardware module as inaccessible to the operating system.

15. The system of claim 14, wherein the means comprises a flexible I/O interface including:
a plurality of registers configured to store the performance-performance-based addresses for the hardware modules; and
a plurality of multiplexers configured to map the operating-system-identified addresses into the performance-parameter-based addresses for the hardware modules.

16. The system of claim 14, wherein the at least one performance parameter is selected from the group consisting of a leakage current, an operating speed, and a temperature for each of the hardware modules.

17. The system of claim 14, wherein each substantially-identical hardware module is selected from a group consisting of a CPU core, a hardware thread for a digital signal processor, an algorithmic logic unit, a vector processing engine, a WLAN interface, and an L2 cache.

18. The system of claim 14, wherein the means is configured to receive interrupts from the operating system or peripherals as the operating-system-identified addresses.

19. The system of claim 14, wherein the means for mapping the operating-system-identified addresses into the performance-parameter-based addresses is further responsive to operating modes for the operating system.

20. The system of claim 19, wherein the means is configured to detect a low power operating mode for the operating system and to map the operating-system-identified addresses responsive to a characterization of the leakage current for each hardware module.

* * * * *